United States Patent [19]

Tokui

[11] Patent Number: 5,565,951
[45] Date of Patent: Oct. 15, 1996

[54] CAMERA

[75] Inventor: Masaki Tokui, Kanagawa-ken, Japan

[73] Assignee: Olympus Optical Co., Ltd., Tokyo, Japan

[21] Appl. No.: 283,988

[22] Filed: Aug. 1, 1994

[30]  Foreign Application Priority Data

Aug. 10, 1993  [JP]  Japan .................................. 5-198555

[51] Int. Cl.$^6$ ................................................ G03B 17/02
[52] U.S. Cl. ........................................... 396/538; 396/514
[58] Field of Search ........................... 354/173.1, 173.11, 354/275, 288, 212, 217, 218

[56]  References Cited

U.S. PATENT DOCUMENTS

| | | | |
|---|---|---|---|
| 4,714,335 | 12/1987 | Malloy Desormeaux | 354/214 |
| 4,969,000 | 11/1990 | Ohara et al. | 354/173.1 |
| 5,122,823 | 6/1992 | Baxter et al. | 354/212 |
| 5,231,438 | 7/1993 | Smart | 354/281 |
| 5,323,201 | 6/1994 | Richiuso et al. | 354/288 |

FOREIGN PATENT DOCUMENTS 5-241234  5/1993  Japan .
5150345  6/1993  Japan .

Primary Examiner—Michael L. Gellner
Assistant Examiner—Nicholas J. Tuccillo
Attorney, Agent, or Firm—Louis Weinstein

[57]  ABSTRACT

A camera of this invention is provided with: a housing cover for covering an opening of a patrone housing chamber, a lever movable between a position to lock the housing cover and a position to unlock the housing cover, a movable roller for deciding whether a film is drawn out of a patrone loaded in the patrone housing chamber, a lock lever for allowing the lever to move to the position to unlock the housing cover when it is decided that the film is not drawn out and preventing the lever from moving to the position to unlock said housing cover when it is decided that the film is drawn out, a mount plate for moving to a position to drive a spool shaft of the patrone in correlation to the loading of the patrone and for holding a position between the spool shaft drive position and the opening of the patrone housing chamber when the patrone is not loaded, and an eject lever having a notch for engaging the mount plate in the spool shaft drive position and a bent portion for disengaging the mount plate from the notch in correlation to the movement of the lever to the unlock position. Such structure of the camera prohibits the housing cover from being unlocked when the film is drawn out of the loaded patrone.

15 Claims, 6 Drawing Sheets

CAMERA

BACKGROUND OF THE INVENTION

1. Field of the Invention

This invention relates to a camera, and more particularly, to a camera using a cartridge-type film patrone.

2. Description of the Related Art

Various kinds of cameras using cartridge-type film patrones have been suggested heretofore. For example, Japanese Laid-open Patent Publication No. 4-1624 discloses a camera having a housing hole portion in which a film patrone with the whole film housed therein is loaded and a housing cover for covering a film patrone load opening of the housing hole portion, and an eject mechanism in the camera for moving the film patrone to a position, where the film patrone can be readily taken out, in correlation to the opening and closing movements of the housing cover.

Furthermore, Japanese Utility Model Publication No. 43-11025 discloses a camera in which a roller for detecting the surface of a film serves to unlock a rewind knob for opening and closing a rear cover, and Japanese Utility Model Publication No. 43-31735 discloses a camera in which the detection of the end of a film links to the unlocking of a rear cover. Such mechanism for unlocking the rear cover in response to the detection of the film is well known.

Still furthermore, a camera in which a film patrone is ejected by being directly pushed up by a spring and a camera in which a cartridge housing case is moved by releasing the ejection lock are respectively suggested in Japanese Laid-open Patent Publications Nos. 4-215634 and 3-261931.

However, in the above mentioned camera disclosed in Japanese Laid-open Patent Publication No. 4-1624, another action of opening the housing cover by hand is required in order to take out the film patrone. Such troublesome operation hinders rapid changing of film patrones.

Since the camera described in Japanese Laid-open Patent Publication No. 4-215634 has a structure so as to slide the cover, space for housing the cover is needed and it is hard to make the camera compact. Furthermore, the cover slides only toward the center of the camera to be opened, and therefore, there is a small degree of freedom in designing the camera. In addition, since no lock mechanism is mounted, it is feared that an exposed film will be further exposed to light by inadvertently opening the cover during picture taking.

Still furthermore, since the film patrone is itself not ejected in the camera disclosed in Japanese Laid-open Patent Publication No. 3-261931, it is necessary to set a proper eject angle of the case or to form slots to be pinched by fingers in order to easily remove the film patrone. This places a strong constraint on the design of the camera.

SUMMARY OF THE INVENTION

A first object of this invention is to provide a camera having a highly safe film loading means.

A second object of this invention is to provide a camera which is excellent in operability.

A third object of this invention is to provide a camera having a compact film loading means.

A fourth object of this invention is to provide a camera in which a film patrone can be loaded and unloaded only when a film is completely wound into the patrone.

A fifth object of this invention is to provide a camera having a highly safe and highly operable compact film loading means in which a film patrone can be loaded and unloaded only when a film is completely wound into the patrone.

In brief, a camera using a cartridge-type film patrone according to this invention is provided with a lock means movable between a position to lock a housing cover for covering an opening of a patrone chamber and a position to unlock the housing cover, and a lock control means for allowing the lock means to move to the position to unlock the housing cover when the patrone is not loaded and for prohibiting the lock means from moving to the position to unlock the housing cover when the patrone is loaded and a film is drawn out.

These as well as other objects and advantages of this invention will become further apparent from the following detailed explanation.

DESCRIPTION OF THE PREFERRED EMBODIMENTS

An embodiment of this invention will now be described with reference to the drawings.

FIGS. 1 to 7 denote an embodiment of this invention.

Figure 1:
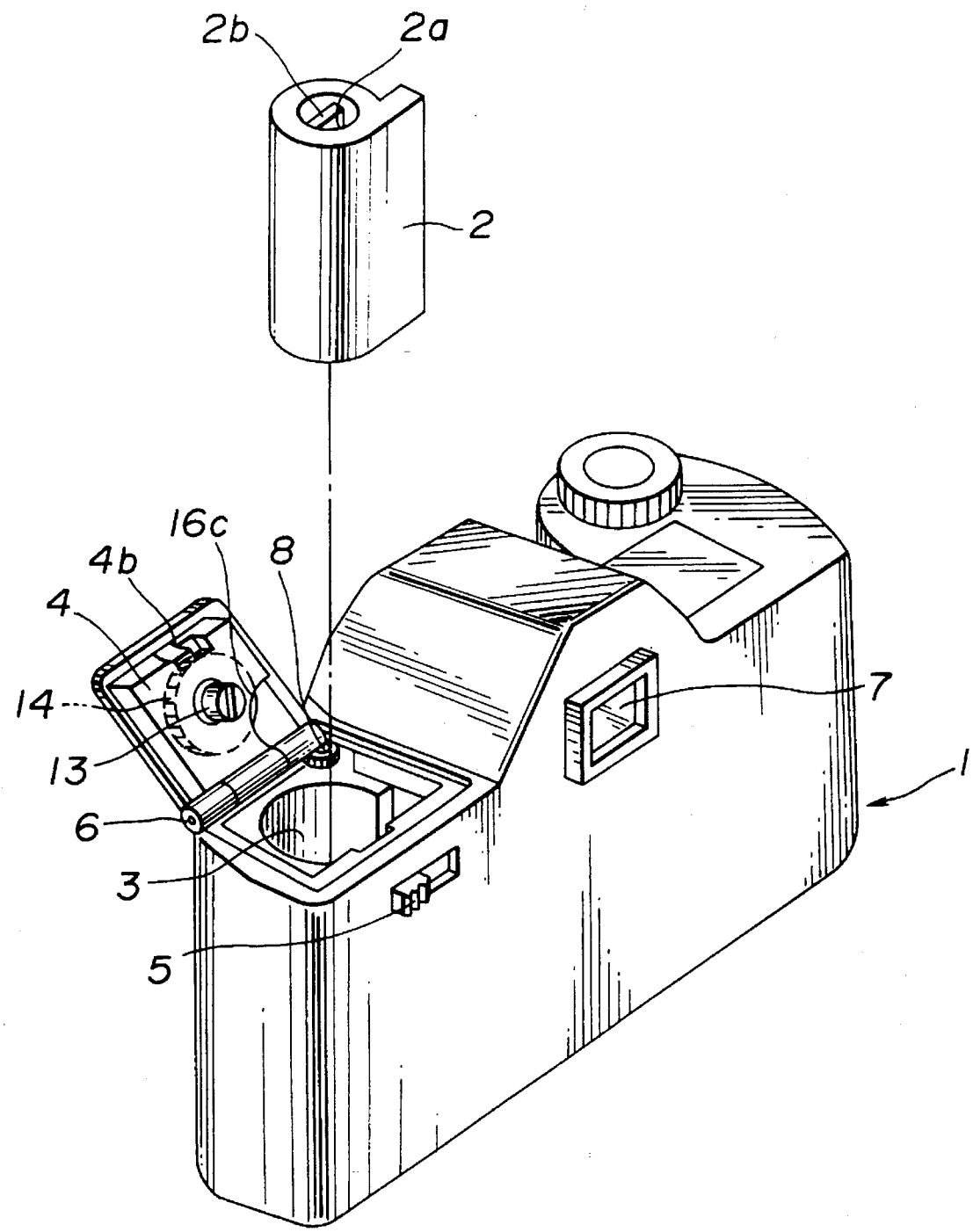
FIG. 1 is a perspective view of a camera and a film patrone taken from the rear side thereof according to an embodiment of this invention.

FIG. 1 is a perspective view of a camera 1 taken from the rear side thereof in a state in which an unillustrated lock means is released by shifting a release knob 5 and a housing cover 4 is opened to put in or take out a patrone 2.

The patrone 2 to be loaded in the camera 1 is, as shown in FIG. 1, provided with a film spool shaft 2a inside thereof for winding a film thereon in a roll, and engaging portions 2b on the upper and lower surfaces which are integrally formed with the spool shaft 2a or mounted to be drivingly connected to the spool shaft 2a inside the patrone 2. The spool shaft 2a is rotated by the rotating force transmitted through the engagement of the engaging portions 2b and a rewind shaft or a film feed shaft mounted in the camera 1, thereby feeding or rewinding the film out of or into the patrone 2.

A patrone housing chamber 3 for housing the above-mentioned patrone 2 is located, for example, on the left side inside the camera 1.

An opening through which the patrone 2 is loaded is formed on the top of the patrone housing chamber 3, and covered and uncovered by the housing cover 4.

The housing cover 4 is designed to swing open and close about a hinge portion 6 mounted along the upper front edge of the camera 1. The housing cover 4 is usually urged by an unillustrated spring toward the open direction, and opened and closed by shifting the release knob 5. The release knob 5 is a slidable switch member mounted near the opening of the patrone housing chamber 3 on the upper left side on the surface of the camera 1 having an eyepiece 7 shown in FIG. 1.

A patrone driving shaft 13 to be engaged with the spool shaft 2a of the patrone 2 projects from almost the center of a surface of the housing cover 4 which is the lower surface when the housing cover 4 is closed. Inside the housing cover 4, a wind gear 14 which rotates in correlation to the patrone driving shaft 13 to receive the driving force is mounted together with a one-way clutch 15 (see FIG. 2).

The driving force is transmitted to the patrone driving shaft 13 through a wind planetary gear 8 (see FIGS. 3 and 4) functioning as a driving gear disposed in the camera body to engage with the wind gear 14.

On the other hand, a notch 16c (see FIGS. 1 and 2) in the shape of a part of a near arc is formed in a part of the housing cover 4. The wind gear 14 of the patrone driving shaft 13 and the wind planetary gear 8 engage with each other through the notch 16c when the patrone 2 is loaded and the housing cover 4 is closed.

In loading the patrone 2 or unloading the patrone 2 after picture taking, a photographer slides the release knob 5, thereby disengaging the lock mechanism from a hook portion 4b of the housing cover 4, enabling the housing cover 4 mounted on the hinge portion 6 to be urged by the unillustrated spring in the counterclockwise direction in FIG. 1 to pivot in the same direction and open.

Figure 2:
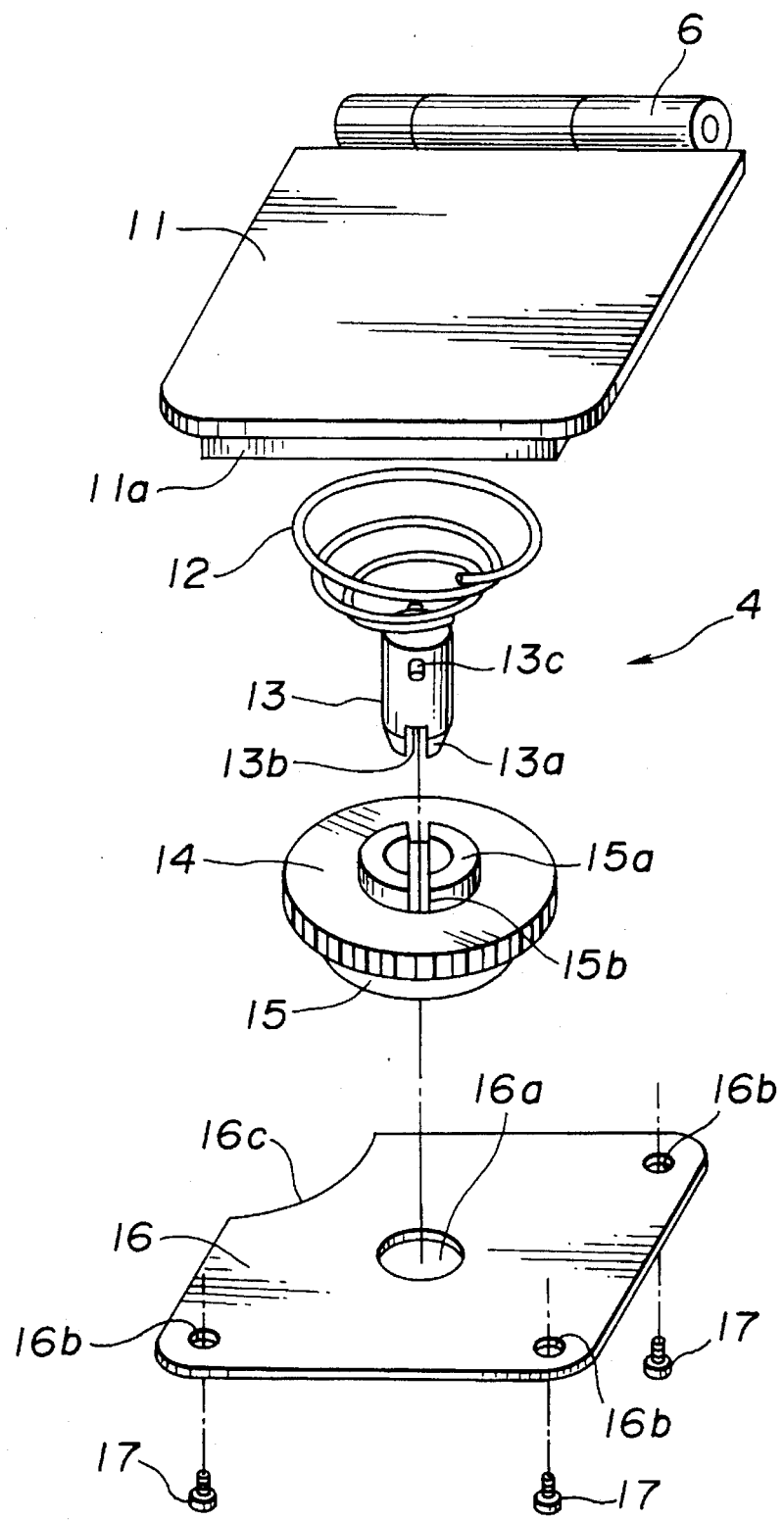
FIG. 2 is a perspective view of a housing cover exploded in the direction of thickness thereof in the embodiment of FIG. 1.

FIG. 2 is a perspective view of the housing cover 4 exploded in the direction of thickness thereof to explain the structure of the housing cover 4 more specifically.

The principal part of the housing cover 4 is constituted by the combination of a cover member 11, a spring 12, the patrone driving shaft 13, the wind gear 14, the one-way clutch 15 and a lower plate member 16 arranged in order downwardly from above the top and in the direction of thickness thereof.

The cover member 11 is an almost rectangular plate member to form a part of the exterior of the camera 1, and is provided with the hinge portion 6 formed at one end thereof on the front side of the camera 1 (the side on which a picture-taking optical system is located), and a step portion 11a, which keeps the patrone housing chamber 3 lighttight after the patrone 2 is loaded, on the lower side. An unillustrated concave portion capable of housing the below-mentioned spring 12, the patrone driving shaft 13, the wind gear 14 and so on therein is further formed on the lower side of the cover member 11.

The spring 12 is a compression coil spring having a large diameter on the upper side and a small diameter on the lower side. The upper side thereof is attached to the cover member 11, and the lower side thereof is engaged with, for example, two pins 13c planted on the peripheral surface of the patrone driving shaft 13 to urge the patrone driving shaft 13 downward in FIG. 2.

The leading end of the patrone driving shaft 13 is shaped like a fork by a slot 13b formed perpendicular thereto, and a chamfer 13a is formed on the periphery of the leading end, thereby smoothly engaging the patrone driving shaft 13 with the engaging portion 2b of the patrone 2 when the housing cover 4 is closed.

The one-way clutch 15 capable of selectively transmitting the rotation only in one direction is coaxially connected to the lower surface of the wind gear 14, and provided with an insertion hole for the patrone driving shaft 13 in the center thereof. A cylindrical portion 15a having an insertion hole for the patrone driving shaft 13 projects upward from the one-way clutch 15, and a slot 15b, in which the pins 13c of the patrone driving shaft 13 can move upward and downward, is formed in such position as to divide the cylindrical portion 15a into two equal parts in the circumferential direction. The wind gear 14 is integrally mounted on the one-way clutch 15 to engage with the cylindrical portion 15a.

When the patrone 2 is loaded and the housing cover 4 is closed, if the engaging portion 2b of the spool shaft 2a of the patrone 2 and the slot 13b as an engaging portion of the patrone driving shaft 13 do not engage well by accident because of the disagreement thereof in orientation, the patrone driving shaft 13 moves upward along the slot 15b of the one-way clutch 15 and compresses the spring 12, thereby closing the housing cover 4 to a predetermined position where the hook portion 4b (see FIG. 1) is locked.

Even if the engaging portion 2b of the patrone 2 and the slot 13b of the patrone driving shaft 13 are not engaged with each other as described above, when the patrone driving shaft 13 is rotated by the driving force transmitted from the wind planetary gear 8 to the wind gear 14, it is moved downward by the urging force of the spring 12 in a position where the patrone driving shaft 13a can engage with the spool shaft 2a, and the engagement thereof is completed. After that, the spool shaft 2a of the patrone 2 can be rotated.

The lower plate member 16 is mounted by screws 17 or the like from below to fix the spring 12, the patrone driving shaft 13, the wind gear 14 and the one-way clutch 15 between the cover member 11 and the lower plate member 16. The lower plate member 16 has a circular hole 16a capable of piercing the patrone driving shaft 13 therethrough almost in the center thereof, and holes 16b at three corners for the screws 17 fixing the lower plate member 16. Furthermore, the notch 16c in the shape of a part of a near arc is formed at the other corner to expose a part of the wind gear 14 therefrom and to connect the wind gear 14 to the wind planetary gear 8 in the camera body therein when the housing cover 4 is closed.

Figure 3:
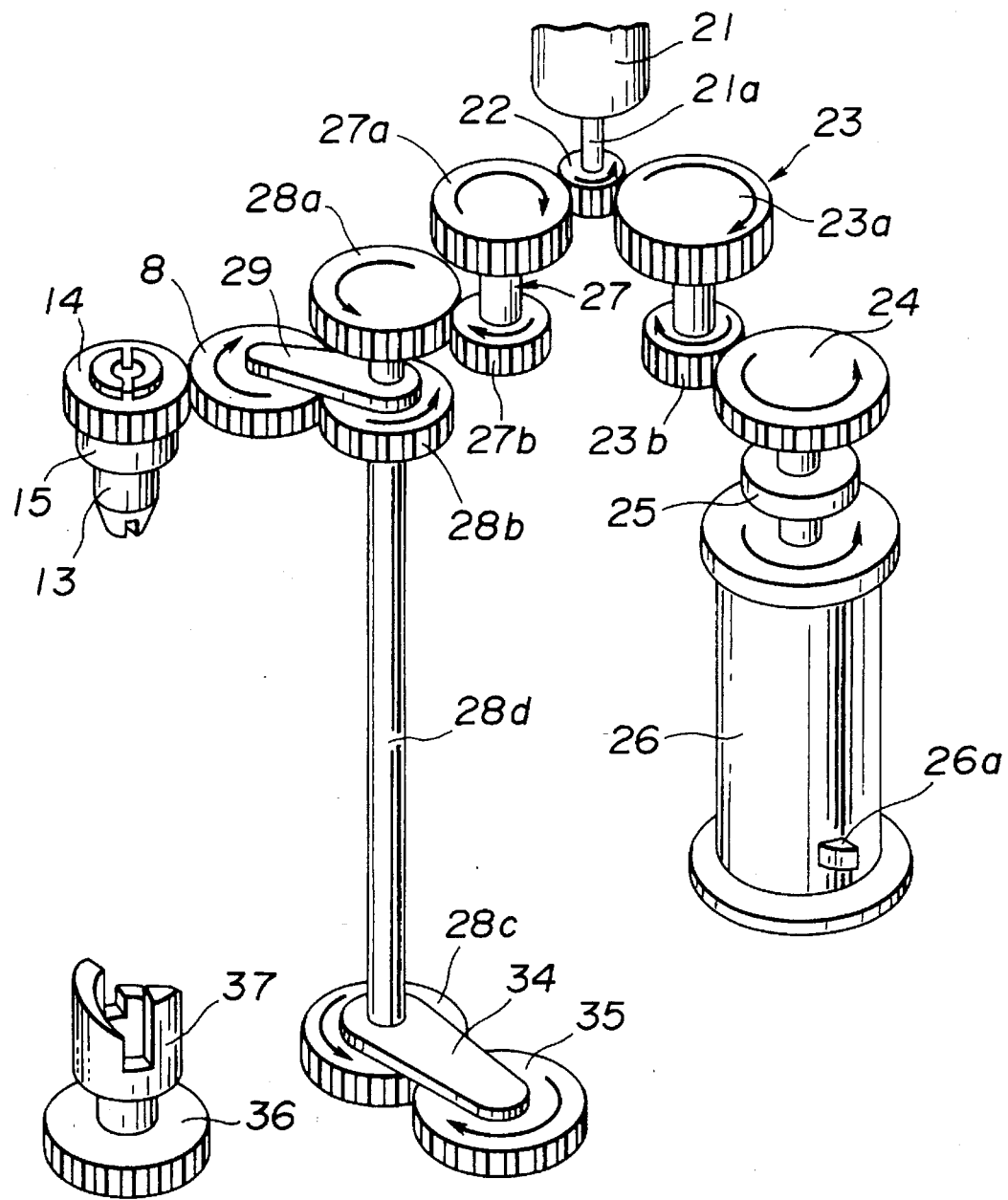
FIG. 3 is a perspective view showing a wind state of a film transport mechanism in the embodiment of FIG. 1.
Figure 4:
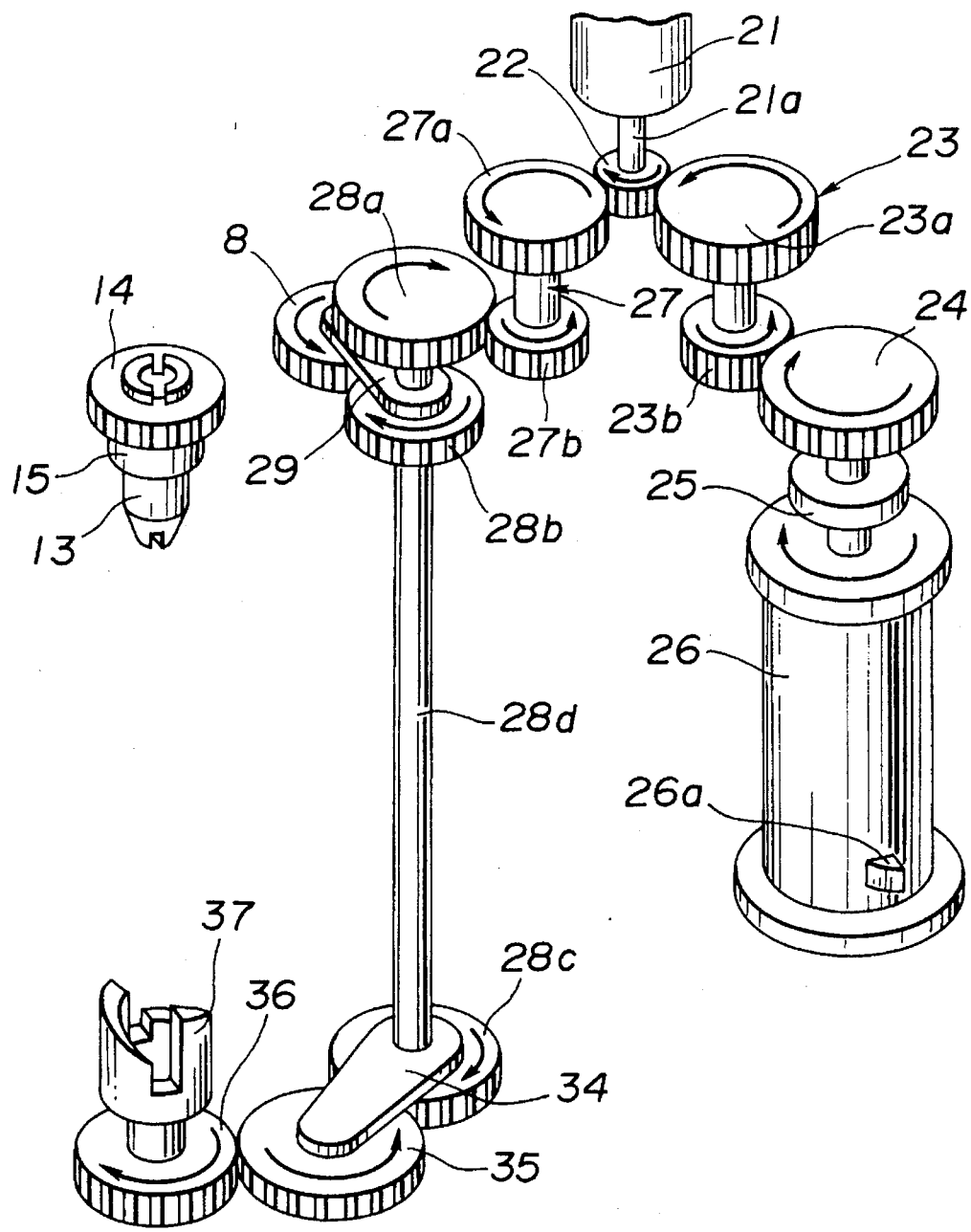
FIG. 4 is a perspective view showing a rewind state of the film transport mechanism in the embodiment of FIG. 1.

FIGS. 3 and 4 are perspective views of a film feeding mechanism in this embodiment, and respectively show a film wind state, and a film rewind state.

A pinion gear 22 is fixed to an output shaft 21a of a film transport motor 21. A major diameter gear 23a of a reduction gear 23 for spool driving is engaged with the pinion gear 22, and a minor diameter gear 23b rotating together with the major diameter gear 23a is engaged with a gear 24 of a spool 26 in the camera body.

The spool 26 is a cylindrical member connected to the gear 24 through a one-way clutch 25 having such structure as to transmit the driving force counterclockwise in FIG. 3 when the gear 24 is rotated in the same direction, and a claw 26a projects in the lower peripheral portion thereof.

A train of gears are engaged with the pinion gear 22 to drive the patrone drive shaft 13 to be engaged with the spool shaft 2a of the film patrone 2.

In other words, a major diameter gear 27a of a reduction gear 27 is engaged with the pinion gear 22, and a small diameter gear 27*b* to be rotated together with the major diameter gear 27*a* is engaged with a gear 28*a*.

The gear 28*a* is provided with a shaft 28*d* which rotates together therewith, and a wind sun gear 28*b* is mounted in an upper portion of the shaft 28*d* near the gear 28*a*, and a rewind sun gear 28*c* is mounted at the bottom of the shaft 28*d* to be integrally rotated.

The wind planetary gear 8 is engaged with the wind sun gear 28*b*, and supported rotatably around the wind sun gear 28*b* by a wind arm 29.

The wind gear 14 is engaged with the wind planetary gear 8, and connected to the patrone driving shaft 13 through the one-way clutch 15 to rotate integrally as described above. Since the one-way clutch 15 is thus interposed, the counterclockwise driving force is transmitted to the patrone driving shaft 13 when the wind gear 14 is rotated in the counterclockwise direction in FIG. 3, and no driving force is transmitted to the patrone driving shaft 13 when the wind gear 14 is rotated clockwise.

A rewind planetary gear 35 is engaged with the rewind sun gear 28*c*, and is supported rotatably around the wind sun gear 28*c* by a rewind arm 34.

The rewind planetary gear 35 is to be engaged with a rewind gear 36 on which a lower fork 37 is mounted to project upward and rotate integrally therewith.

A film wind operation will be described with reference to FIG. 3.

When the pinion gear 22 is rotated by the motor 21 in the counterclockwise direction in FIG. 3, the driving force of the motor 21 is transmitted through the reduction gear 23, and the spool 26 is rotated in the film wind direction (counterclockwise in FIG. 3).

On the other hand, the driving force of the motor 21 is also transmitted from the reduction gear 27 to the gear 28*a*, and further transmitted to the wind gear 14 through the wind sun gear 28*b* and the wind planetary gear 8. Then, the patrone driving shaft 13 engages with the spool shaft 2*a* of the film patrone 2, and the spool shaft 2*a* is rotated in the film feed out direction, thereby feeding a leading end of a film out of the film patrone 2 toward an unillustrated spool chamber of the camera 1 in which the spool 26 is mounted.

At this time, the rewind planetary gear 35 is disengaged from the rewind gear 36 by the action of a planetary clutch, and the lower fork 37 is rotated in correlation to the movement of the spool shaft 2*a* of the film patrone 2.

When the film is fed out from the patrone 2 and one of perforations of the film is caught by the claw 26*a* formed on the spool 26, the film wind operation by the rotation of the spool 26 is started.

If the diameter of the spool 26 and the feed-out and wind reduction gear ratios are set so that the film wind velocity of the spool 26 is higher than the film feed-out velocity of the spool shaft 2*a* of the patrone 2 driven by the patrone driving shaft 13, the patrone driving shaft 13 is rotated by the film which is wound by the spool 26. At this time, the patrone driving shaft 13 is brought into an almost free state under no influence of the wind gear 14 by the action of the one-way clutch 15.

The film rewind operation will now be described with reference to FIG. 4.

When the pinion gear 22 is rotated by the motor 21 clockwise in FIG. 4, the wind planetary gear 8 is disengaged from the wind gear 14 by the action of a planetary clutch, and the patrone driving shaft 13 is freed. To the contrary, the rewind planetary gear 35 is engaged with the rewind gear 36.

The driving force of the motor 21 is transmitted from the reduction gear 27 to the gear 28*a*, and further transmitted through the rewind sun gear 28*c* and the rewind planetary gear 35 to rotate the lower fork 37 in the film rewind direction.

At this time, the diameter of the spool 26 and the wind and rewind reduction gear ratios are set so that the rotation of the motor 21 is not transmitted to the spool 26 by the action of the one-way clutch 25. In other words, the film is rewound by the lower fork 37.

As described above, the film feed-out operation and the film rewind operation can be respectively performed by the patrone driving shaft 13 and the lower fork 37, and the reduction gear ratios of the gears subsequent to the planetary clutches may be arbitrarily set.

Figure 5:
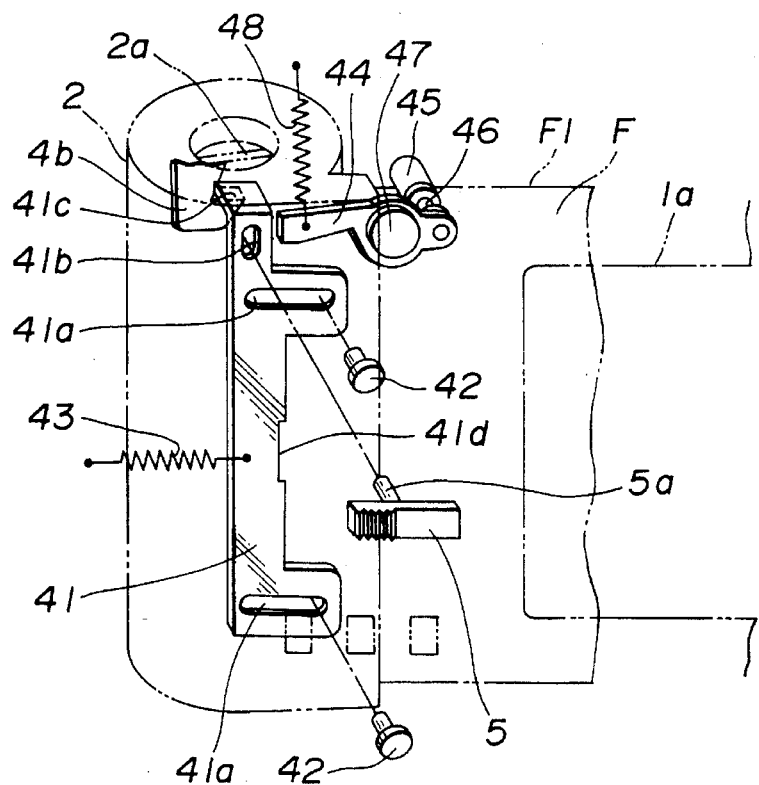
FIG. 5 is a perspective view of a film loading lock mechanism of the embodiment of FIG. 1 in a state in which the housing cover is prohibited from being unlocked.

FIG. 5 illustrates a basic structure of a film loading lock mechanism in this embodiment.

An aperture 1*a* for controlling an exposure area on a film F is formed inside the camera 1 as shown in FIG. 5, and the patrone housing chamber 3 (see FIG. 1) in which the film patrone 2 is loaded is located on the left side of the aperture 1*a* in the figure. The film F is fed out from the film patrone 2 toward the aperture 1*a*.

On the side of the patrone housing chamber 3 at the back of the camera 1 (the front side in FIG. 5), a lever 41 as a lock means for locking the housing cover 4 is mounted. The lever 41 is made of an oblong plate member provided with projecting portions on the right side at the bottom and near the top thereof, which respectively have slots 41*a* for sliding the lever 41 in the rightward and leftward directions.

A somewhat oblong slot 41*b* is formed near and above the upper one of the slots 41*a*, and a bent portion 41*c* is formed above the slot 41*b* to be bent toward the front side of the camera 1. The bent portion 41*c* engages with the hook portion 4*b* of the housing cover 4.

The lever 41 is further provided with a somewhat oblong notch 41*d* at about midway between the slots 41*a* on the right side in the figure. An end of a spring 43 is connected to the lever 41 on the left side of the notch 41*d* to urge the lever 41 leftward in FIG. 5.

Shafts 42 fixed to an unillustrated base plate by caulking are fitted into the slots 41*a* of the lever 41, so that the lever 41 urged by the spring 43 can be smoothly shifted in the rightward and leftward directions in FIG. 5.

On the other hand, a shaft portion 5*a* of the above-mentioned release knob 5 is fitted into the slot 41*b*, so that the lever 41 can be shifted rightward against the urging force of the spring 43 by an operation of the release knob 5 from outside of the camera 1.

On the right side of the bent portion 41*c* of the lever 41 near the upper portion of the patrone housing chamber 3 of the camera 1, a lock lever 44 as a lock control means is pivotally fixed by a shaft 47 fixed to an unillustrated base plate by caulking. The lock lever 44 is urged clockwise in FIG. 5 by a spring 48 connected to one end thereof, and a shaft 46 for rotatably supporting a roller 45 as a detection means is fixed to the other end thereof.

FIG. 5 shows a state in which the film F is being fed out from the patrone 2. In this state, a film edge F1 rotates the roller 45 counterclockwise in FIG. 5 against the urging force of the spring 48.

At this time, the lock lever 44 pivots counterclockwise in FIG. 5, and one end thereof intrudes into a moving range of the lever 41. Therefore, when the film F is being fed out from the patrone 2, even if an attempt is made to shift the release knob 5 rightward in FIG. 5, the shift is restricted by the lock lever 44 and the hook portion 4b and the bent portion 41c cannot be disengaged from each other.

Figure 6:
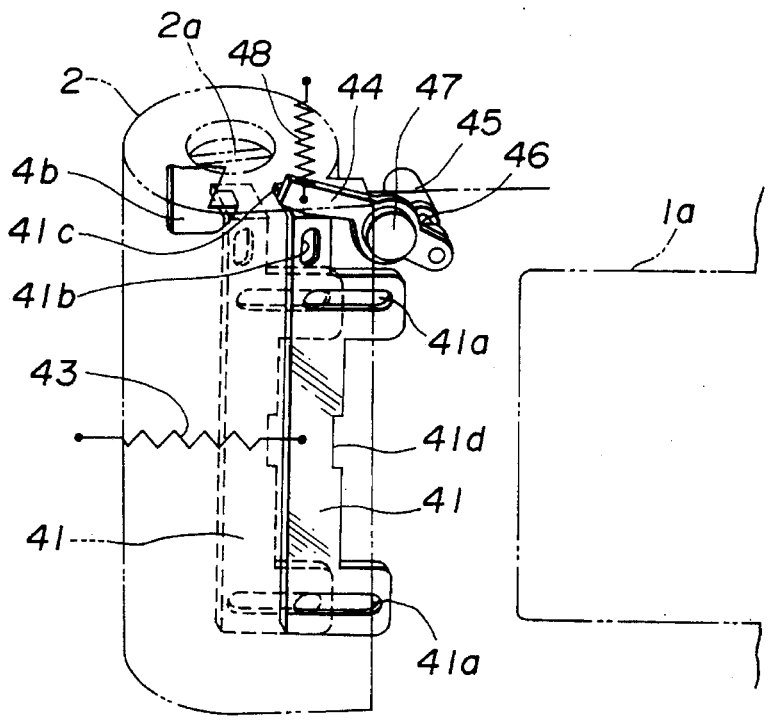
FIG. 6 is a perspective view of the film loading lock mechanism of the embodiment of FIG. 1 in a state in which the housing cover is allowed to be unlocked.

FIG. 6 illustrates a state in which the film F is completely wound into the patrone 2.

Since the film F is not present in the pivot range of the lock lever 44 at this time, the lock lever 44 is pivoted clockwise in FIG. 6 by the urging force of the spring 48 and stopped by an unillustrated stopper. At this time, one end of the lock lever 44 is retracted outside the moving range of the lever 41.

Accordingly, when the release knob 5 is shifted rightward in FIG. 6, the lever 41 is moved rightward along the slots 41a and the bent portion 41c thereof is also moved rightward and disengaged from the hook portion 4b of the housing cover 4. Then, the housing cover 4 is opened by the urging force of an unillustrated spring, and the patrone 2 can be taken out of the patrone housing chamber 3.

When the housing cover 4 is opened to load the patrone 2, the lever 41 urged by the spring 43 is in a position shown in a broken line in FIG. 6. When the patrone 2 is loaded and the housing cover 4 is closed, the hook portion 4b is brought into contact with the bent portion 41c of the lever 41. The contact of an arc portion of the hook portion 4b and the bent portion 41c shifts the lever 41 rightward against the urging force of the spring 43. After passing the leading end of the hook portion 4b, the lever 41 is returned by the urging force of the spring 43, thereby completing the lock of the housing cover 4.

Figure 7:
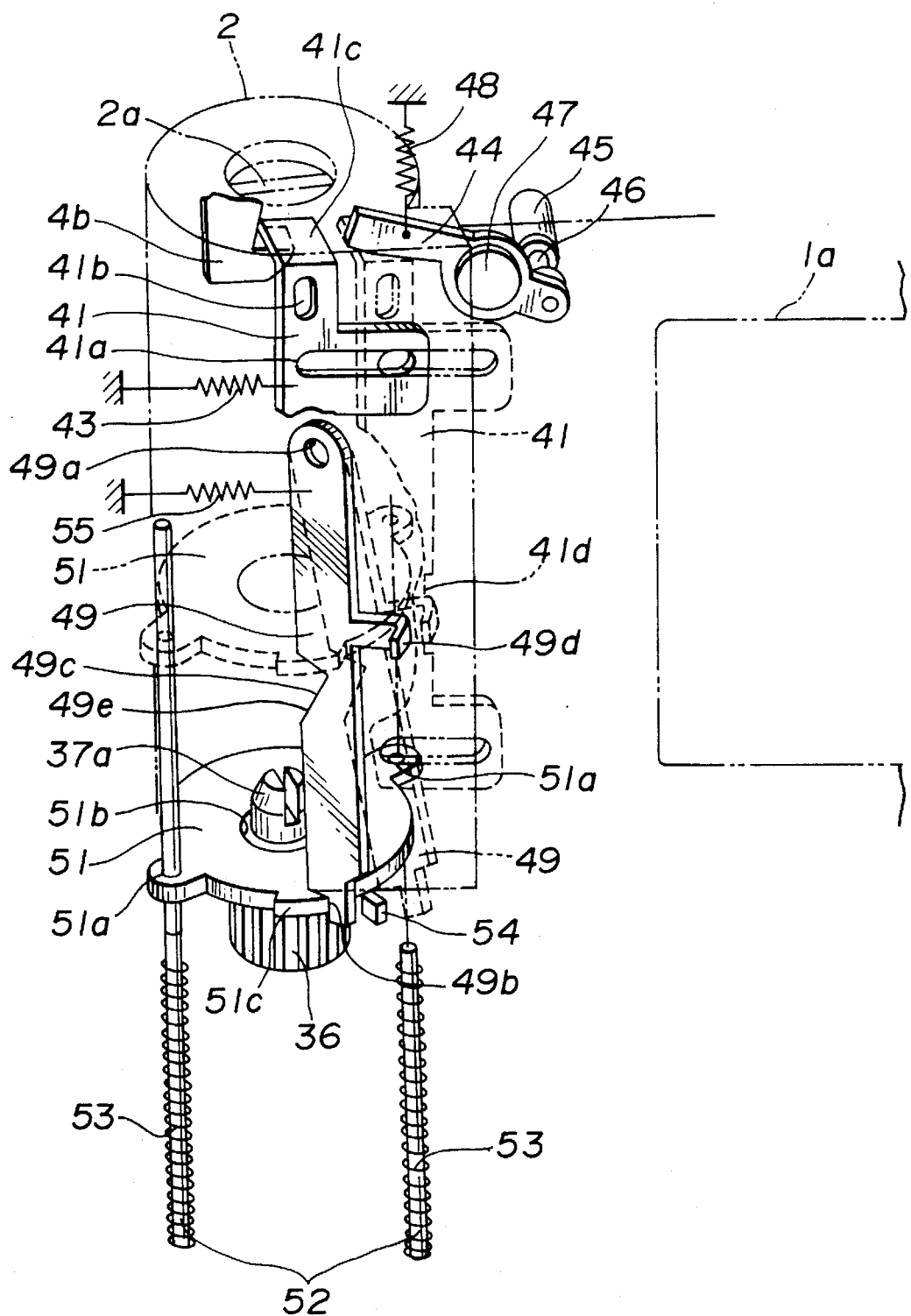
FIG. 7 is a perspective view of an eject mechanism for the film patrone in the embodiment of FIG. 1.

FIG. 7 illustrates an eject mechanism for the patrone 2.

On one side of an unillustrated base plate on the side of the patrone 2 between the lever 41 and the patrone 2, an eject lever 49 is mounted pivotally about an unillustrated pivot shaft fitted in an upper hole 49a, and the pivot behavior in the clockwise direction in FIG. 7 is always given to the eject lever 49 by a spring 55 for urging the eject lever 49 clockwise.

The eject lever 49 is made of a somewhat slim plate material, and is provided with a notch 49c of a nearly triangular shape at one side in the center thereof, and a notch 49b as a lock portion at the leading end (the bottom end in FIG. 7) thereof. Furthermore, a hooked bent portion 49d as an interlock portion projects from the side opposed to the notch 49c of the eject lever 49, and the leading end of the bent portion 49d extends into the movement range of the lever 41.

At the bottom of the patrone housing chamber 3 (see FIG. 1), a lower fork 37a (having a different shape from that of the lower fork 37 shown in FIGS. 3 and 4) to be engaged with the patrone 2 is mounted, and a rewind gear 36 for rewinding the film F is attached to the bottom of the lower fork 37a and connected to the wind and rewind mechanisms shown in FIGS. 3 and 4.

A mount plate 51 in the shape of a doughnut for receiving the patrone 2 in the axial direction is fitted as a patrone release means on the periphery of the lower fork 37a, and provided with a hole 51b in the center thereof through which the lower fork 37a extends. The mount plate 51 further has a projection 51c on a part of the periphery thereof, and two projecting portions each having a guide hole 51a positioned to divide the periphery of the mount plate 51 into two equal parts. Guide shafts 52 are respectively pierced through the guide holes 51a at a fixed interval to guide the mount plate 51 in the upward and downward directions.

These guide shafts 52 are fixed to an unillustrated part of the camera body, and a compression spring 53 is wound on each of the guide shafts 52, thereby urging the mount plate 51 movably upward.

In the eject mechanism having such structure, when the patrone 2 is not loaded, the mount plate 51 is pushed up to a position shown in by broken line in FIG. 7 by the urging force of the compression springs 53. At this time, the mount plate 51 is retained by the engagement of the projection 51c and the notch 49c of the eject lever 49 in a position shown in a broken line in FIG. 7.

In FIG. 7, the position of the spring 43 is shifted above those in FIGS. 5 and 6 for the purpose of illustration.

The operation when the patrone 2 is loaded will be described.

In a state in which the housing cover 4 is opened as shown in FIG. 1, the patrone 2 is pushed into the patrone housing chamber 3 through the opening until the bottom of the patrone 2 comes into contact with the mount plate 51 in the upper position shown in the broken line in FIG. 7.

When the photographer pushes the patrone 2 further into the patrone housing chamber 3 by pushing the upper surface of the patrone 2 against the urging force of the compression springs 53, the projection 51c of the mount plate 51 moves downward while pressing a slope 49e at one side of the notch 49c of the eject lever 49. Furthermore, when the patrone 2 reaches a predetermined position to engage with the lower fork 37a, the mount plate 51 abuts against a stopper 54 mounted in the camera body, and is prohibited from moving further downward.

On the other hand, the lower fork 37a is formed in a separate piece from the rewind gear 36 so as to retract when it does not properly align with the spool shaft 2a of the patrone 2 well, and urged upward by the compression springs 53 as in a well-known manner.

When the mount plate 51 abuts against the stopper 54, since the other notch 49b of the eject lever 49 is positioned to form a small clearance between it and the upper surface of the projection 51c of the mount plate 51, the eject lever 49 is pivoted clockwise in FIG. 7 by the urging force of the urging spring 55 and is brought into contact with the mount plate 51 in a position to prohibit the mount plate 51 from moving upward. Even if the photographer stops the insertion of the patrone 2 and moves his hand off the patrone 2 in this state, the patrone 2 is held in the patrone housing chamber 3.

When the housing cover 4 shown in FIG. 1 is closed, the bent portion 41c of the lever 41 is moved rightward against the urging force of the spring 43 by the arc portion at one end of the hook portion 4b of the housing cover 4, and is returned to the locked position by the urging force of the spring 43, thereby completing the locking operation of the housing cover 4.

An operation when the lock mechanism is released and the patrone 2 is taken out will now be described.

As shown in FIGS. 1, 5 and 6, when the photographer shifts the release knob 5 rightward, if the lock lever 44 is out of the operation range of the lever 41, the lever 41 is shifted rightward to release the lock of the housing cover 4. At this time, the notch 41d formed on one side near the center of the lever 41 engages with the bent portion 49d of the eject lever 49 and pivots the eject lever 49 counterclockwise in FIG. 7.

Then, the notch 49b at the leading end of the eject lever 49 and the projection 51c of the mount plate 51 are disengaged, and the mount plate 51 is moved upward along the guide shafts 52 by the urging force of the compression springs 53. Since the patrone 2 is also shifted upward by the urging force and the upper portion thereof protrudes from the patrone housing chamber 3, the patrone 2 can be easily taken out.

Though the lock of the housing cover 4 and the eject mechanism is released in correlation to the movement of the lever 41 controlled by the release knob 5 in the above description, either the housing cover 4 or the eject mechanism can be first released by setting the dimensions of the components in the above lock portions in a predetermined relation. In other words, it is possible to first open the housing cover 4 by sliding the release knob 5, and then, to move the patrone 2 upward. To the contrary, it is possible to release the lock of the housing cover 4 and simultaneously shift the housing cover 4 and the patrone 2 after bringing the patrone 2 into a state in which it is urged to move upward.

It is needless to say that the release knob 5 cannot be shifted and the lock of the housing cover 4 and the eject mechanism is not released when the lock lever 44 detects the film edge F1 and one end thereof is positioned in the operation range of the lever 41.

As described above, according to the embodiment of this invention, when the patrone is loaded, the housing cover is opened only by shifting the release knob, and the patrone is ejected and protruded in a position in which the patrone can be easily taken out. Therefore, a camera having extremely high operability can be achieved.

Furthermore, since the interlock member is interposed between the release knob and the patrone, the camera is not required to be large and there is no constraint on the open direction of the housing cover.

Still furthermore, the patrone may be ejected after or upon opening the housing cover. How to eject the patrone may be determined according to the type of users and cameras.

In addition, since the determination is made as to whether the film is fed out of the patrone and the ejection of the film patrone is prohibited by restricting the shift of the release knob when the film is fed out, highly safe and rapid film loading can be achieved.

As described above, according to this invention, it is possible to provide a camera including a highly safe and highly operable compact film loading means in which a film patrone can be loaded and unloaded only when a film is completely wound into the patrone.

In this invention, it is apparent that working modes different in a wide range can be formed on this basis of this invention without departing from the spirit and scope of the invention. This invention is not restricted by any specific embodiment except as may be limited by the appended claims.

What is claimed is:

1. A camera using a cartridge-type film patrone, comprising:

lock means movable between a position to lock a housing cover for covering an opening of a patrone chamber and a position to unlock said housing cover;

detecting means for deciding whether a film is drawn out of said patrone loaded in said patrone chamber;

lock control means for preventing said lock means from moving to the position to unlock said housing cover when it is decided by said detecting means that said film is drawn out, and for moving said lock means to the position to unlock said housing cover when it is decided that said film is not drawn out; and protruding means for protruding said patrone from said patrone chamber in correlation to the movement of said lock means when it is decided that said film is not drawn out.

2. A camera according to claim 1 wherein said protruding means comprises a movable platform arranged in said patrone chamber and being moved between a first position near a bottom of said chamber and a second position displaced from said bottom position; and latch means for locking said platform in said first position and being movable by said lock control means to unlock said lever latch means enabling said platform to move to said second position to cause a patrone in said chamber to protrude therefrom when said cover means is open.

3. A camera according to claim 2 wherein said latch means further comprises means for latching said latch means to hold said platform in said second position, said platform being released from said second position when a patrone is pushed into said patrone chamber.

4. A camera according to claim 3 wherein said latch means is provided with an inclined surface engaging a protrusion on said platform for urging said latch means away from the position latching said platform in said second position.

5. A camera according to claim 2 wherein said latch means further comprises means for latching said platform when said cover is open and a patrone inserted into said patrone chamber moves said platform to said first position.

6. A camera according to claim 5 further including locking means for locking and unlocking said cover, said locking means moving said latch means to unlatch said platform when said locking means is operated to unlock said cover; and bias means urging said platform upwardly when the platform is unlatched to cause a loaded patrone to protrude from the patrone chamber.

7. A camera according to claim 1 further comprising a gear rotatably mounted to said housing cover said cover being movable between an open and a closed position, said gear being selectively engageable with a first driven gear provided in said camera when said housing cover is closed; and a patrone driving shaft mounted on said cover and being movable relative to and selectively engageable with said first driven gear and being normally urged into said patrone chamber for engagement with a patrone spool shaft when said cover is in the closed position.

8. A camera according to claim 7 further comprising one-way clutch means arranged between said spool shaft and said first driven gear for driving said spool shaft in only one direction to permit unwinding of film from said patrone and prevent rewinding of film into said patrone by said driven gear.

9. A camera according to claim 7 further comprising a second driven gear arranged in said patrone chamber at an end thereof opposite said opening;

a drive shaft coupled to said second driven gear;

a drive motor having an output capable of providing a rotational drive force in either of two opposing directions;

means responsive to the drive rotation of said drive means in a first direction for coupling drive to one of said first and second driven gears and responsive to drive rotation of said drive means in a second direction for coupling drive to another one of said first and second driven gears.

10. A camera according to claim 9 wherein said means for coupling comprises first and second planetary gear assemblies.

11. A camera according to claim 10 further comprising a rotatably mounted take-up spool; and means for coupling drive from said drive source to said take-up spool.

12. A camera according to claim 11 further comprising one-way clutch means coupled between said means for coupling and said rotatably mounted spool for coupling a driving force from said drive source to said take-up spool when said coupling means is rotated in a first direction and for disengaging said driving force when said means for coupling is rotated in a second direction.

13. A camera using a cartridge-type film patrone, comprising:

lock means movable between a position to lock a housing cover for covering an opening of a patrone chamber and a position to unlock said housing cover; and lock control means engageable with a film protruding from said patrone for allowing said lock means to move to the position to unlock said housing cover when said patrone is not loaded and prohibiting said lock means from moving to the position to unlock said housing cover by being obstructed by a film when said film patrone is loaded and said film is drawn out of said patrone.

14. A camera using a cartridge-type film patrone, comprising:

lock means movable between a position to lock a housing cover for covering an opening of a patrone chamber and a position to unlock said housing cover;

lock control means for allowing said lock means to move to the position to unlock said housing cover when said patrone is not loaded and prohibiting said lock means from moving to the position to unlock said housing cover by being obstructed by a film when said film patrone is loaded and said film is drawn out of said patrone;

driving means, arranged at an end opposite said opening of said patrone chamber, for driving a spool shaft of said patrone;

movable patrone release means being moved to a first position where said spool shaft of said patrone engages said driving means responsive to said loading of a patrone into said chamber, said patrone release means being moved to a second position between said first position and said opening of said patrone chamber when the patrone chamber does not contain a patrone; and lever means having a least a lock portion for locking said patrone release means when said patrone is loaded in a predetermined position and an interlock portion for releasing the lock by said lock portion in correlation to the movement of said lock means to the position to unlock said housing cover, wherein said housing cover cannot be unlocked when said film is drawn out of said loaded patrone.

15. A camera using a cartridge-type film patrone, comprising:

lock means movable between a position to lock a housing cover for covering an opening of a patrone chamber and a position to unlock said housing cover;

detecting means for deciding whether a film is drawn out of said patrone loaded in said patrone chamber;

lock control means for preventing said lock means from moving to the position to unlock said housing cover when it is decided by said detecting means that said film is drawn out, and for moving said lock means to the position to unlock said housing cover when it is decided that said film is not drawn out; and protruding means for protruding said patrone from said patrone chamber in correlation to the movement of said lock means when it is decided that said film is not drawn out;

said detecting means comprising a swingably mounted roller normally urged in a first direction and movable in a direction opposite said first direction when engaged by the edge of a film protruding from said patrone;

a lever operated by said roller movable between a blocking and an unblocking position when a protruding film edge is respectively present and absent;

a hook member protruding from said cover and engaged by said lock control means; and a control knob for moving said lock control means to move said lock control means out of engagement with said hook when said lever is in the unblocking position.

* * * * *